United States Patent
Levy et al.

(10) Patent No.: US 11,327,974 B2
(45) Date of Patent: May 10, 2022

(54) FIELD VARIABILITY BASED TCAM SPLITTING

(71) Applicant: MELLANOX TECHNOLOGIES TLV LTD., Raanana (IL)

(72) Inventors: Gil Levy, Hod Hasharon (IL); Aviv Kfir, Nili (IL); Salvatore Pontarelli, Rome (IT); Pedro Reviriego, Madrid (ES); Matty Kadosh, Hadera (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 672 days.

(21) Appl. No.: 16/052,646

(22) Filed: Aug. 2, 2018

(65) Prior Publication Data
US 2020/0042629 A1  Feb. 6, 2020

(51) Int. Cl.
*G06F 16/2455* (2019.01)
*G06F 16/28* (2019.01)

(52) U.S. Cl.
CPC ...... *G06F 16/24558* (2019.01); *G06F 16/285* (2019.01)

(58) Field of Classification Search
CPC ... H04L 45/7457; H04L 63/101; H04L 12/56; H04L 12/6418; H04L 49/3063; G06F 16/90339; G06F 16/258; G06F 16/285; G06F 16/21558; G06F 16/24558
USPC .......... 711/108; 370/392, 235, 389; 707/999.006
See application file for complete search history.

(56) References Cited

U.S. PATENT DOCUMENTS

| | | | |
|---|---|---|---|
| 5,537,514 A | 7/1996 | Nishidai | |
| 6,611,875 B1 | 8/2003 | Chopra et al. | |
| 6,957,215 B2 | 10/2005 | Stark | |
| 7,051,078 B1 | 5/2006 | Cheriton | |
| 7,054,315 B2 | 5/2006 | Liao | |
| 7,061,874 B2 | 6/2006 | Merugu et al. | |
| 7,116,663 B2 | 10/2006 | Liao | |
| 7,234,019 B1 | 6/2007 | Kao et al. | |
| 7,366,830 B1 * | 4/2008 | Maheshwari | G11C 15/00 711/108 |
| 7,394,809 B2 | 7/2008 | Kumar et al. | |
| 7,426,518 B2 * | 9/2008 | Venkatachary | H04L 45/00 707/999.102 |
| 7,804,699 B2 | 9/2010 | Gupta et al. | |

(Continued)

OTHER PUBLICATIONS

Che et al., "DRES: Dynamic Range Encoding Scheme for TCAM Coprocessors", IEEE Transactions on Computers, vol. 57, No. 7, pp. 902-915, Jul. 2008.

(Continued)

*Primary Examiner* — Alford W Kindred
*Assistant Examiner* — Cecile H Vo
(74) *Attorney, Agent, or Firm* — Kligler & Associates Patent Attorneys Ltd (57) ABSTRACT

A collection of rules comprising fields that may have wildcard values. The method includes defining first and second subsets of the fields, the second subset being exclusive of the first subset. Intersections of overlapping fields of the first subset are added to the first subset to form an augmented first subset. Metadata from the augmented first subset and the fields not selected for the first subset are combined to define second parts of the rules. Data items are classified by matching a search key to one of the first parts and one of the second parts of the rules.

22 Claims, 3 Drawing Sheets

(56) References Cited

U.S. PATENT DOCUMENTS

| | | | |
|---|---|---|---|
| 7,933,282 B1 | 4/2011 | Gupta et al. | |
| 8,271,564 B2 | 9/2012 | Dade et al. | |
| 8,290,934 B2 | 10/2012 | Stergiou et al. | |
| 8,305,271 B2 | 11/2012 | Li et al. | |
| 8,462,786 B2 * | 6/2013 | Liu | H04L 45/7453 726/13 |
| 8,468,296 B1 * | 6/2013 | Cohen | G11C 15/00 365/49.1 |
| 8,619,766 B2 | 12/2013 | Wang et al. | |
| 8,856,203 B1 * | 10/2014 | Schelp | H04L 29/06 709/200 |
| 8,861,347 B2 * | 10/2014 | Bloch | H04L 45/7457 709/224 |
| 8,938,469 B1 | 1/2015 | Keen et al. | |
| 9,087,586 B2 | 7/2015 | Bosshart | |
| 9,098,601 B2 | 8/2015 | Wang | |
| 9,111,615 B1 | 8/2015 | Jiang | |
| 9,171,030 B1 | 10/2015 | Arad et al. | |
| 9,223,711 B2 | 12/2015 | Philip et al. | |
| 9,245,626 B2 * | 1/2016 | Fingerhut | H04L 49/00 |
| 9,262,312 B1 | 2/2016 | Gazit et al. | |
| 9,317,517 B2 | 4/2016 | Attaluri et al. | |
| 9,344,366 B2 | 5/2016 | Bouchard et al. | |
| 9,406,381 B2 * | 8/2016 | Akerib | G06F 16/2228 |
| 9,411,908 B2 | 8/2016 | Valency et al. | |
| 9,424,366 B1 | 8/2016 | Gazit et al. | |
| 9,438,505 B1 | 9/2016 | Zhou et al. | |
| 9,543,015 B1 | 1/2017 | Roy | |
| 9,569,561 B2 | 2/2017 | Wildman et al. | |
| 9,627,063 B2 | 4/2017 | Dharmapurikar | |
| 9,659,046 B2 | 5/2017 | Sen et al. | |
| 9,672,239 B1 * | 6/2017 | Rottenstreich | H04L 61/2514 |
| 9,704,574 B1 | 7/2017 | Shamis | |
| 9,779,123 B2 | 10/2017 | Sen et al. | |
| 9,785,666 B2 | 10/2017 | Li et al. | |
| 9,866,479 B2 | 1/2018 | Wang et al. | |
| 9,892,057 B2 | 2/2018 | Levy et al. | |
| 9,984,144 B2 | 5/2018 | Levy et al. | |
| 10,049,126 B2 | 8/2018 | Levy et al. | |
| 10,068,034 B2 | 9/2018 | Levy et al. | |
| 10,097,378 B2 | 10/2018 | Dong et al. | |
| 2002/0089937 A1 | 7/2002 | Venkatachary et al. | |
| 2002/0154636 A1 | 10/2002 | Thomas | |
| 2003/0123459 A1 | 7/2003 | Liao | |
| 2004/0100950 A1 | 5/2004 | Basu et al. | |
| 2006/0209725 A1 | 9/2006 | Cadambi et al. | |
| 2008/0192754 A1 | 8/2008 | Ku et al. | |
| 2008/0215518 A1 | 9/2008 | Matsuda | |
| 2008/0228691 A1 | 9/2008 | Shavit et al. | |
| 2008/0259667 A1 | 10/2008 | Wickeraad | |
| 2009/0097654 A1 | 4/2009 | Blake | |
| 2010/0080223 A1 | 4/2010 | Wong et al. | |
| 2010/0269024 A1 | 10/2010 | Hao et al. | |
| 2012/0054467 A1 | 3/2012 | Fulton et al. | |
| 2012/0137060 A1 * | 5/2012 | Akerib | G11C 15/00 711/E12.078 |
| 2012/0275466 A1 | 11/2012 | Bhadra et al. | |
| 2013/0311492 A1 | 11/2013 | Calvignac et al. | |
| 2014/0006706 A1 | 1/2014 | Wang | |
| 2014/0089498 A1 | 3/2014 | Goldfarb et al. | |
| 2014/0201307 A1 | 7/2014 | Banavalikar et al. | |
| 2014/0215144 A1 | 7/2014 | Valency et al. | |
| 2014/0310307 A1 | 10/2014 | Levy et al. | |
| 2015/0058595 A1 | 2/2015 | Gura et al. | |
| 2015/0127900 A1 * | 5/2015 | Dharmapurikar | H04L 45/7453 711/108 |
| 2015/0207735 A1 | 7/2015 | Kuramoto | |
| 2015/0242429 A1 | 8/2015 | Varvello et al. | |
| 2015/0244842 A1 | 8/2015 | Laufer et al. | |
| 2016/0202932 A1 | 7/2016 | Kadu | |
| 2016/0294625 A1 | 10/2016 | Mahkonen et al. | |
| 2017/0046395 A1 | 2/2017 | Li et al. | |
| 2017/0053012 A1 | 2/2017 | Levy et al. | |
| 2017/0147254 A1 | 5/2017 | Adams et al. | |
| 2017/0195253 A1 | 7/2017 | Annaluru et al. | |
| 2017/0346765 A1 | 11/2017 | Immidi | |
| 2018/0278525 A1 | 9/2018 | Levy et al. | |
| 2018/0330412 A1 | 11/2018 | Fredriksson et al. | |
| 2019/0036821 A1 | 1/2019 | Levy et al. | |
| 2019/0042304 A1 | 2/2019 | Wang et al. | |
| 2020/0089816 A1 | 3/2020 | Shattah | |

OTHER PUBLICATIONS

Liu et al., "TCAM Razor: A Systematic Approach Towards Minimizing Packet Classifiers in TCAMs", IEEE/ACM Transactions on Networking, vol. 18, No. 2, pp. 490-500, Apr. 2010.

Liu et al., "All-Match Based Complete Redundancy Removal for Packet Classifiers in TCAMs", Proceedings of IEEE 27th Conference on Computer Communications (INFOCOM 2008), pp. 574-582, Apr. 13-18, 2008.

Liu et al., "Complete Redundancy Removal for Packet Classifiers in TCAMs", IEEE Transactions on Parallel and Distributed Systems, vol. 21, No. 4, pp. 424-437, Apr. 2010.

Taylor et al., "Scalable Packet Classification using Distributed Crossproducting of Field Labels", IEEE INFOCOM, pp. 1-12, 2005.

U.S. Appl. No. 15/663,758 office action dated Mar. 28, 2019.

U.S. Appl. No. 14/827,402 office action dated Apr. 16, 2019.

Lakshminarayanan et al., "Algorithms for advanced packet classification with ternary CAMs", Proceedings of the 2005 conference on Applications, technologies, architectures, and protocols for computer communications (SIGCOMM 05), pp. 193-204, Aug. 21-26, 2005.

Pagh, R., "Cuckoo Hashing for Undergraduates", IT University of Copenhagen, 6 pages, Mar. 27, 2006.

Pagh et al., "Cuckoo Hashing", Journal of Algorithms, vol. 51, pp. 122-144, May 2004.

Kirsch et al., "Less Hashing, Same Performance: Building a Better Bloom Filter", Random Structures and Algorithms, vol. 33, issue 2, pp. 187-218, Sep. 2008.

Kirsch et al., "More Robust Hashing: Cuckoo Hashing with a Stash", SIAM Journal on Computing, vol. 39, Issue 1, pp. 1543-1561, Sep. 2009.

Patrow, A., "General Purpose Hash Function Algorithms", 6 pages, year 2000 http://www.partow.net/programming/hashfunctions/.

Laurence et al., "Spam Based Architecture for team for Low Area and Less Power Consumption", ARPN Journal of Engineering and Applied Sciences, vol. 10, No. 17, pp. 7607-7612, Sep. 2015.

Song et al., "Fast Hash Table Lookup Using Extended Bloom Filter: An Aid to Network Processing", Proceedings of SIGCOMM Conference, Philadelphia, USA, pp. 181-192, Aug. 21-26, 2005.

Waldvogel et al., "Scalable High-Speed Prefix Matching", ACM Transactions on Computer Systems (TOCS), vol. 19, Issue 4, pp. 440-482, Nov. 2001.

Vamanan et al., "EffiCuts: optimizing packet classification for memory and throughput", Proceedings of the SIGCOMM conference, New Delhi, India, pp. 207-218, Aug. 30-Sep. 3, 2010.

Singh et al., "Packet classification using multidimensional cutting", Proceedings of SIGCOMM Conference, Karlsrube, German, pp. 213-224, Aug. 25-29, 2003.

Taylor et al., "ClassBench: a packet classification benchmark", WUCSE-2004-28, Applied Research Laboratory Department of Computer Science and Engineering, Washington University, Saint Louis, USA, 37 pages, May 21, 2004.

Demetriades et al., "An Efficient Hardware-basedMulti-hash Scheme for High Speed IP Lookup", 16th IEEE Symposium on High Performance Interconnects, pp. 103-110, Aug. 26-28, 2008.

Meiners et al., "Algorithmic Approaches to Redesigning TCAM-Based Systems", Proceedings of the 2008 ACM SIGMETRICS international conference on Measurement and modeling of computer systems (SIGMETRICS '08), pp. 467-468, Jun. 2-6, 2008.

Kasnavi et al., "A cache-based internet protocol address lookup architecture", Computer Networks, vol. 52, pp. 303-326, year 2008.

(56) References Cited

OTHER PUBLICATIONS

Matousek, et al., "ClassBench-ng: Recasting ClassBench After a Decade of Network Evolution", Proceedings of the Symposium on Architectures for Networking and Communications Systems (ANCS '17), 13 pages, May 2017.
U.S. Appl. No. 15/469,530 office action dated Dec. 14, 2018.
U.S. Appl. No. 16/132,549 Office Action dated Oct. 28, 2020.
U.S. Appl. No. 16/559,658 Office Action dated Nov. 25, 2020.
Hua et al., "Variable-Stride Multi-Pattern Matching For Scalable Deep Packet Inspection", IEEE INFOCOM, pp. 415-423, Rio de Janeiro, Brazil, Apr. 19-25, 2009.
U.S. Appl. No. 16/559,658 office action dated Jul. 23, 2020.
Xu et al., "A Novel Hash-based Packet Classification Algorithm," 5th International Conference on Information Communications & Signal Processing, pp. 1504-1508, Dec. 2005.
Pontarelli et al., "Parallel d-Pipeline: A Cuckoo Hashing Implementation for Increased Throughput", IEEE Transactions on Computers, vol. 65, No. 1, pp. 326-331, Jan. 2016.
Reviriego et al., "Energy Efficient Exact Matching for Flow Identification with Cuckoo Affinity Hashing", IEEE Communications Letters, vol. 18, No. 5, pp. 885-888, May 2014.
Pontarelli et al., "Cuckoo Cache: A Technique to Improve Flow Monitoring Throughput", IEEE Internet Computing, vol. 20, issue 4, pp. 1-11, Jul.-Aug. 2016.
Zhou et al., "Scalable, High Performance Ethernet Forwarding with CUCKOOSWITCH", CoNEXT '13, pp. 1-12, Santa Barbara, USA, Dec. 9-12, 2013.
U.S. Appl. No. 16/865,560 Office Action dated Oct. 14, 2021.
U.S. Appl. No. 16/865,560 Advisory Action dated Dec. 7, 2021.
Bi et al, "Hierarchical trie packet classification algorithm based on expectation-maximization clustering," research article, PLOS ONE, pp. 1-12, Jul. 13, 2017, as downloaded from https://journals.plos.org/plosone/article?id=10.1371/journal.pone.0181049.
Baboescu et al., "Scalable Packet Classification," IEEE/ACM Transactions on Networking, vol. 13, No. 1, pp. 2-14, Feb. 2005.
Kogan et al., "Strategies for Mitigating TCAM Space Bottlenecks," IEEE 22nd Annual Symposium on High-Performance Interconnects, IEEE Computer Society, pp. 25-32, year 2014.
U.S. Appl. No. 16/865,560 Office Action dated Jun. 24, 2021.
U.S. Appl. No. 17/013,697 Office Action dated Jan. 13, 2022.
U.S. Appl. No. 16/865,560 Office Action dated Feb. 8, 2022.

\* cited by examiner

FIELD VARIABILITY BASED TCAM SPLITTING

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to generally to data structures and their storage in computer systems, and more particularly to coding and compression techniques for efficient storage and lookup of classification rules.

2. Description of the Related Art

The meanings of certain acronyms and abbreviations used herein are given in Table 1.

TABLE 1

Acronyms and Abbreviations

| | |
|---|---|
| ASIC | Application-Specific Integrated Circuit |
| BGP | Border Gateway Protocol |
| DIP | Destination IP Address |
| IP | Internet Protocol |
| LPM | Longest Prefix Match |
| MAC | Media Access Control |
| NIC | Network Interface Controller |
| SIP | Source IP Address |
| TCAM | Ternary Content-Addressable Memory |
| TCP | Transmission Control Protocol |
| UDP | User Datagram Protocol |
| VLAN | Virtual Local Area Network |

Packet transfer devices in high-speed data networks, such as switches and routers, are required to perform flexible and sophisticated packet classification at high speed. For this purpose, many network devices use ternary content-addressable memory (TCAM) components to store rules that are to be applied in processing packets.

In network devices like switches, routers or network interface controllers (NICs), there are several functions that need to compare a key formed by packet header fields against a set of rules that may have wildcard bits. This is done for example, for IP forwarding, security or traffic classification. To search the TCAM, several fields of the packet (typically header fields) are concatenated to form a key. A match between the key and a given TCAM entry can be used to trigger various actions for application by the network device, such as forwarding decisions, packet encapsulation and decapsulation, security filtering, and quality of service classification.

The TCAM is advantageous in that it is able to hold search entries that contain not only ones and zeroes to be matched against the key, but also "don't care" bits, which will match either a zero or a one in the key. Such "don't care" bits in the TCAM entries are commonly referred to as "masked" bits, while bits having a defined value (1 or 0) are referred to as "unmasked." The TCAM thus affords a high degree of flexibility in rule definition.

In recent years, the size of the key has become quite large in some cases. This occurs for example in IPv6 access control lists or firewalls. In that case, if the source and destination IP addresses and the layer four ports plus the protocol fields are checked, the key size would be 296 bits. Even larger keys are needed in Openflow tables that can check additional fields like the MAC source and destination addresses or VLAN related fields.

SUMMARY OF THE INVENTION

Large keys can exceed the memory width of existing TCAMs. In those cases, it has been found to be beneficial to split the keys and perform two lookups in TCAMs having relatively narrow memory width in order to complete the search in the set of rules. Additionally, by judicious encoding, a split of the TCAM can reduce the total memory needed to store a set of rules.

There is provided according to embodiments of the invention a method of communication, which is carried out on a collection of rules comprising fields that may have wildcard values. The method includes defining first and second subsets of the fields, the second subset being exclusive of the first subset. Intersections of overlapping fields of the first subset are added to the first subset to form an augmented first subset. The method is further carried out by obtaining metadata from the augmented first subset, defining respective first parts of the rules in the collection from the augmented first subset of the fields, and defining respective second parts of the rules in the collection from the metadata and from the second subset of the fields. The method is further carried out by extracting respective search keys from data items, and classifying the data items by matching the first parts and the second parts of the rules with the search keys.

According to an aspect of the method, defining a first subset includes placing in the first subset fields in which all the elements have wildcard values, ranking remaining fields of the first subset according to variability, and adding to the first subset at least one of the lowest ranking remaining fields.

One aspect of the method includes measuring the variability of the fields according to respective numbers of unique values that occur therein in the collection of rules.

According to another aspect of the method, obtaining metadata includes compressing the fields of the first parts of the rules. Compressing the fields may include identifying respective numbers of unique values ($u_i$) in the fields, and encoding the respective numbers of unique values in $\log_2(1+u_i)$ bits (rounded up).

An additional aspect of the method includes measuring the variability of the fields according to respective numbers of different values that occur therein in the collection of rules divided by a number of rules in the collection of rules.

Yet another aspect of the method is carried out by storing the first and second parts of the rules in a first and second TCAM array, respectively. Matching with the search keys includes searching the first TCAM array and the second TCAM array.

Still another aspect of the method includes constructing the intersections of the overlapping fields using unique values of the overlapping fields other than wildcard values.

There is further provided according to embodiments of the invention an apparatus, including a network element, which is operative for receiving packets via a data network, decision logic circuitry in the network element, and a ternary content-addressable memory (TCAM) storing a collection of rules having a plurality of fields that may have wildcard values, wherein the decision logic circuitry is operative for defining first and second subsets of the fields, in which the second subset is exclusive of the first subset, adding intersections of overlapping fields of the first subset to form an augmented first subset, obtaining metadata from the augmented first subset, defining respective first parts of the rules in the collection from the augmented first subset of the fields, and defining respective second parts of the rules in the collection from the metadata and from the second subset of the fields, storing the first parts of the rules in a first portion of the TCAM, and storing the second parts of the rules in a second portion of the TCAM, extracting respective search keys from data items, and matching one of the first parts and one of the second parts with the search keys thereof by searching the first portion of the TCAM and the second portion of the TCAM, respectively.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

System Description.

Figure 1:
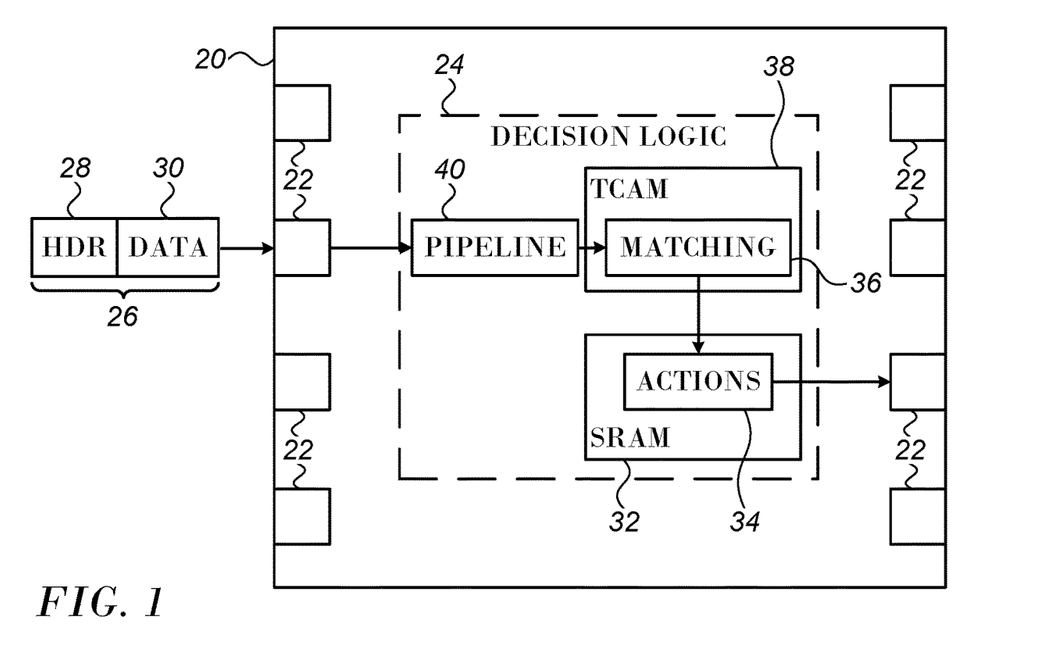
FIG. 1 is a block diagram of a typical network element, which transmits packets in accordance with an embodiment of the invention.

FIG. 1 is a block diagram that schematically illustrates a network element 20, which operates as a packet classification apparatus in accordance with an embodiment of the invention. Typically, network element 20 is a hardware device configured as a network switch or router, for example, with multiple ports 22 connected to a packet communication network. Decision logic 24 within network element 20 applies classification rules in forwarding data packets 26 between ports 22, as well as performing other actions, such as encapsulation and de-capsulation, security filtering, and/or quality-of-service functions. The circuitry needed for carrying out such forwarding and other functions will be apparent to those skilled in the art and is omitted from the figures for the sake of simplicity, in order to concentrate on the actual classification functions of decision logic 24.

In the pictured embodiment, decision logic 24 receives packets 26 containing a header 28 and payload data 30. A processing pipeline 40 in decision logic 24 extracts a classification key from each packet 26, typically (although not necessarily) including the contents of certain fields of header 28. For example, the key may comprise the source and destination addresses and ports and a protocol identifier. Pipeline 40 matches the key against a matching database 36 containing a set of rule entries, which is stored in TCAM 38 in network element 20, as described in detail hereinbelow. SRAM 32 contains a list of actions 34 to be performed when a key is found to match one of the rule entries. For this purpose, each rule entry typically contains a pointer to the particular action that decision logic 24 is to apply to packets 26 in case of a match.

Pipeline 40 typically comprises dedicated or programmable hardware logic, which is configured to carry out the functions described herein. For example, pipeline 40 may comprise a suitable application-specific integrated circuit (ASIC). Alternatively or additionally, at least some of the functions of pipeline 40 may be implemented in a standalone or embedded microprocessor. (For example, such a microprocessor may be responsible for compiling classification rules received by network element 20 into matching database 36.) The microprocessor performs its functions under the control of software instructions, which are typically stored in tangible, non-transitory computer-readable storage media, such as electronic, optical, or magnetic memory media.

When dealing with large keys using TCAMs such as TCAM 38, simply splitting a key and performing two lookups does not guarantee the correct result, as will be seen from the discussion below.

First Embodiment

Figure 2:
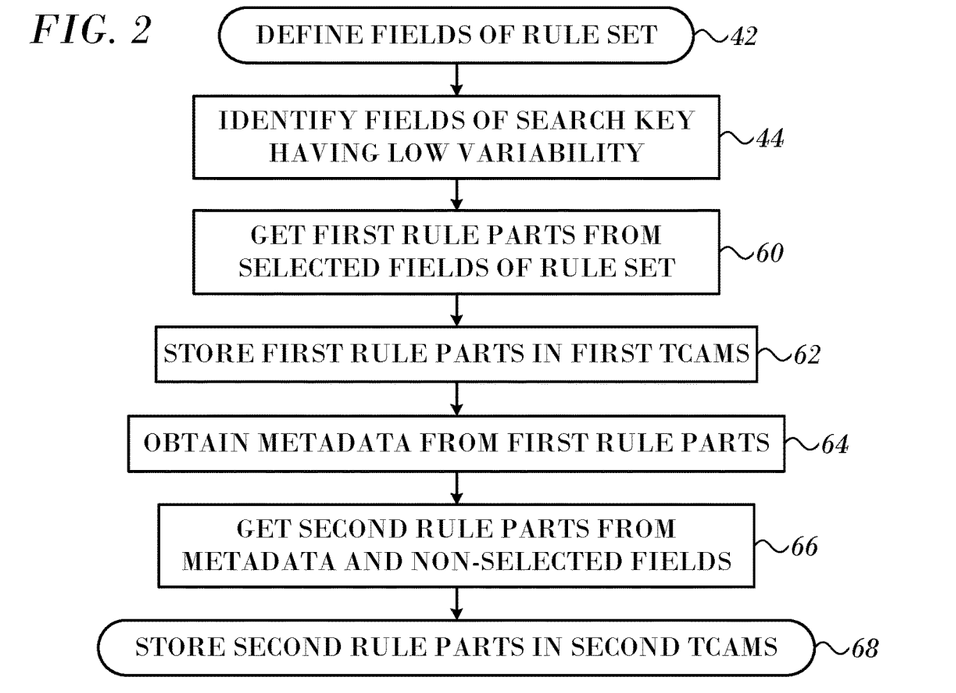
FIG. 2 is a flow chart of a method for accommodating large search keys in a TCAM in accordance with an embodiment of the invention.

FIG. 2 is a flow chart of a method for accommodating large search keys in a TCAM in accordance with an embodiment of the invention. The method involves splitting a search key into at least two portions in accordance and storing the portions in different TCAMs. While a division of a key into two keys is discussed here for clarity, the method can be generalized to accommodate a larger number of divisions of a key, and the details will be apparent to those skilled in the art. In initial step 42 it is assumed that a rule set is available. The fields of a search are identified. For purposes of this disclosure a field may comprise one or more bits, which are assigned particular meanings.

Simply splitting the key into two keys is unsatisfactory. To see why, let us assume that we split each key in two parts $k=\{A,B\}$ and do a lookup first on a first part (A) and then on a second part (B). The result of the lookup on the first part is then appended to the lookup on the second part to search only for the relevant rules.

Example 1

Consider a database with five rules:
$r_1=\{A_1,B_1\}$ $r_2 = \{A_2, B_2\}$
$r_3 = \{A_3, B_3\}$
$r_4 = \{A_4, B_4\}$
$r_5 = \{A_4, B_5\}$ Then a first TCAM, stores first parts (A):

$A_1 \rightarrow M_1$
$A_2 \rightarrow M_2$
$A_3 \rightarrow M_3$
$A_4 \rightarrow M_4$ Metadata $M_i$ is appended to the second parts $B_i$ for the second lookup, so that the second TCAM or TCAM array has the following entries:

$\{M_1, B_1\}$
$\{M_2, B_2\}$
$\{M_3, B_3\}$
$\{M_4, B_4\}$
$\{M_4, B_5\}$

In total, there are nine rules, each smaller than the corresponding original rules. It should be noted that the last two rules ($r_4$, $r_5$) share the same first parts and hence the same metadata $M_4$.

The first lookup on part A gives us metadata M, i.e., data derived from part A according to some prearranged scheme, on which to build a key for the second lookup. This scheme only works if none of the parts A overlap. Two rules overlap when there are keys that match both rules.

For example, let us consider rules that have only two fields, the source and destination layer four ports. The notation "x" denotes a wildcard field. Two rules overlap if a search for a value can match the two rules. Thus, the rules $\{21, x\}$ and $\{x, 80\}$ overlap, as a search for 21, 80 matches the two rules. The two fields assuming the values 21 and 80 are referred to herein as "overlapping fields". In the set of rules considered in Example 1 above, if first parts $A_1$ and $A_2$ overlap, there may be a packet that matches both $A_1$ and $A_2$ but only $B_2$. The two TCAM solution would match $A_1$ and then miss on $B_1$. Thus, the search would fail to find the match on $r_2 = \{A_2, B_2\}$.

In order to deal with overlaps such as the above-noted case of rules $A_1$ and $A_2$, the intersection of the two rules is generated by taking the bits that are not wildcard bits. For example, for two-field rules $\{21, x\}$ and $\{x, 80\}$ the intersection is $\{21, 80\}$. Let us denote the intersection of two rules $A_1$ and $A_2$ as $In(A_1, A_2)$. Then, we add the intersection to the entries stored in the first TCAM and associate the intersection with entries in the second TCAM that match $A_1$ or $A_2$. The rules stored in the scheme of Example 1 would then be in the first part:

$In(A_1, A_2) \rightarrow M_{In}$
$A_1 \rightarrow M_1$
$A_2 \rightarrow M_2$
$A_3 \rightarrow M_3$
$A_4 \rightarrow M_4$, and in the second part:

$\{M_{In}, B_1\}$
$\{M_{In}, B_2\}$
$\{M_1, B_1\}$
$\{M_2, B_2\}$
$\{M_3, B_3\}$
$\{M_4, B_4\}$
$\{M_4, B_5\}$.

It can be seen that additional rules have been added to both the first and second parts, so that now there are a total of twelve rules. The first two rules in the list for the second part are an expansion that is necessary to accommodate the intersection $In(A_1, A_2)$.

The requirement for generating intersections becomes recursive if rule $A_1$ overlaps with $A_2$ and $A_3$. In such a case, when inserting rule $A_1$, it is necessary to first insert $In(A_1, A_2, A_3)$, then $In(A_1, A_2)$ and finally $In(A_1, A_3)$. It is apparent that this procedure can become complex when there are multiple overlapping rules.

In general, key splitting can reduce the number of rules needed on the first half (if several rules have the same first part A) but can also increase it, when overlapping rules force the creation of new rules to accommodate intersections on both the first and second parts. Therefore, it is not clear whether the key splitting into more than one TCAM would require fewer or more memory resources than a traditional scheme in which the entire key is placed in a single wider TCAM.

Embodiments of the invention provide close to optimum memory utilization by selection of the fields of the key that are assigned to a first part and to the second part in order to minimize the number of entries for the first part and the number of intersections. Continuing to refer to the notation of Example 1, the number of entries in a rule table depends on the number of different combinations of the fields selected for the first part A. Intersections are created when those fields appear both in some rules with all bits defined and in other rules that include wildcards. Their number also depends on the number of values that the field could have in the set of rules.

Therefore, to reduce the number of entries, fields that have few unique values are selected in step 44. It has been observed that in many sets of rules, some fields of the key are rarely or never used. That is, they have all their bits with wildcards in most or all of the rules. When a field is always a wildcard field (all 'x'), it cannot generate intersections. Other fields, like the IP protocol field or in some cases the layer four ports, can be used in a significant number of the rules but have a very low number of unique values in the set of rules. As used herein 'variability' means the number of different values (counting all 'x' as one value) that a field can assume within the set of rules divided by the number of rules in the set. Then, fields with low variability should be selected for the first part of the key (A) as such fields can create a limited number of intersections. Thus, two fields with only two values a, b plus the all 'x', can create at most four intersections: $\{a, b\}$, $\{b, a\}$, $\{a, a\}$, $\{b, b\}$ Reference is now made to FIG. 3, which is a flow chart of a method of selecting fields of a set of rules for the first part of a multipart key in step 44 (FIG. 2), using the exemplary above-described scheme in accordance with an embodiment of the invention. The process begins at initial step 46. The fields are described as being represented by bits. In embodiments of the invention fields composed of other elements or data structures may be viewed as collections of bits.

Figure 3:
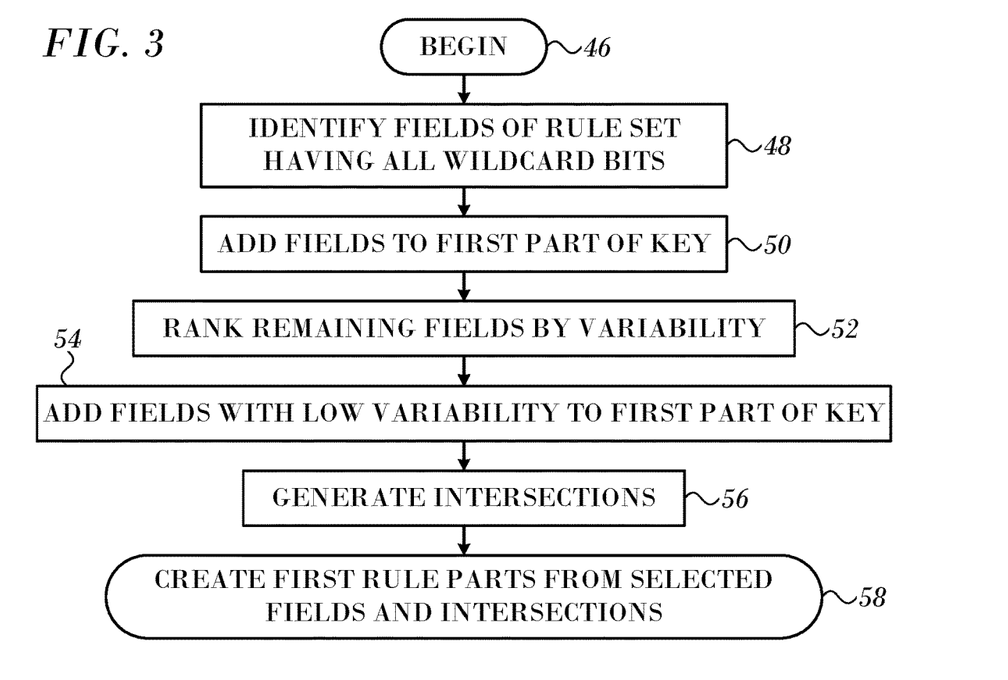
FIG. 3 is a flow chart of a method of selecting fields of a set of rules for the first part of a multipart key in accordance with an embodiment of the invention.

Next, at step 48 fields having all wildcard bits are identified. These fields are selected for the first part of the key in step 50, as they have the lowest possible variability, and cannot create intersections.

Next, at step 52 the remaining fields are ranked by variability as defined above. The fields having the lowest variability are selected for the first part of the key in step 54, limited by the memory width of the TCAM storing the first part of the key. Once that limit is reached, the rest of the fields are assigned to the second part of the key.

Then intersections of the fields chosen for the first part of the key are generated at step 56. At final step 58 the fields of the original rule set and the intersections that were chosen in steps 54, 56 are obtained as first rule parts.

Reverting to FIG. 2, in step 60 first rule parts are obtained as described in the discussion of FIG. 3. The first rule parts are stored in a first TCAM in step 62. Then in step 64 metadata is obtained from the first rule parts.

Next, at step 66 the metadata is associated with the fields of the original rule set that were not chosen in step 54 (FIG. 3) to form second rule parts. The second rule parts are stored in a set of second TCAMs in final step 68.

The algorithm described by FIG. 3 has been tested with OpenFlow sets of rules generated using ClassBench-NG, available on the Internet from Github, and compared with the results obtained by doing an exhaustive search on all the field combinations. The results showed that the proposed algorithm provided close to optimal performance for all the sets of rules considered. The performance was measured with the number of intersections created, the fewer the better. The number of rules needed in the first part was in all cases at least 10 times smaller than the number of rules in the original database.

The variability-based algorithm described above to select the fields for the first part of the search key reduces the intersections, but it does not eliminate them. The remaining intersections create additional entries for the second part of the key that can outweigh the number of entries saved in the first part. Therefore, unnecessary additional entries on the second part due to intersections should be avoided.

Figure 4:
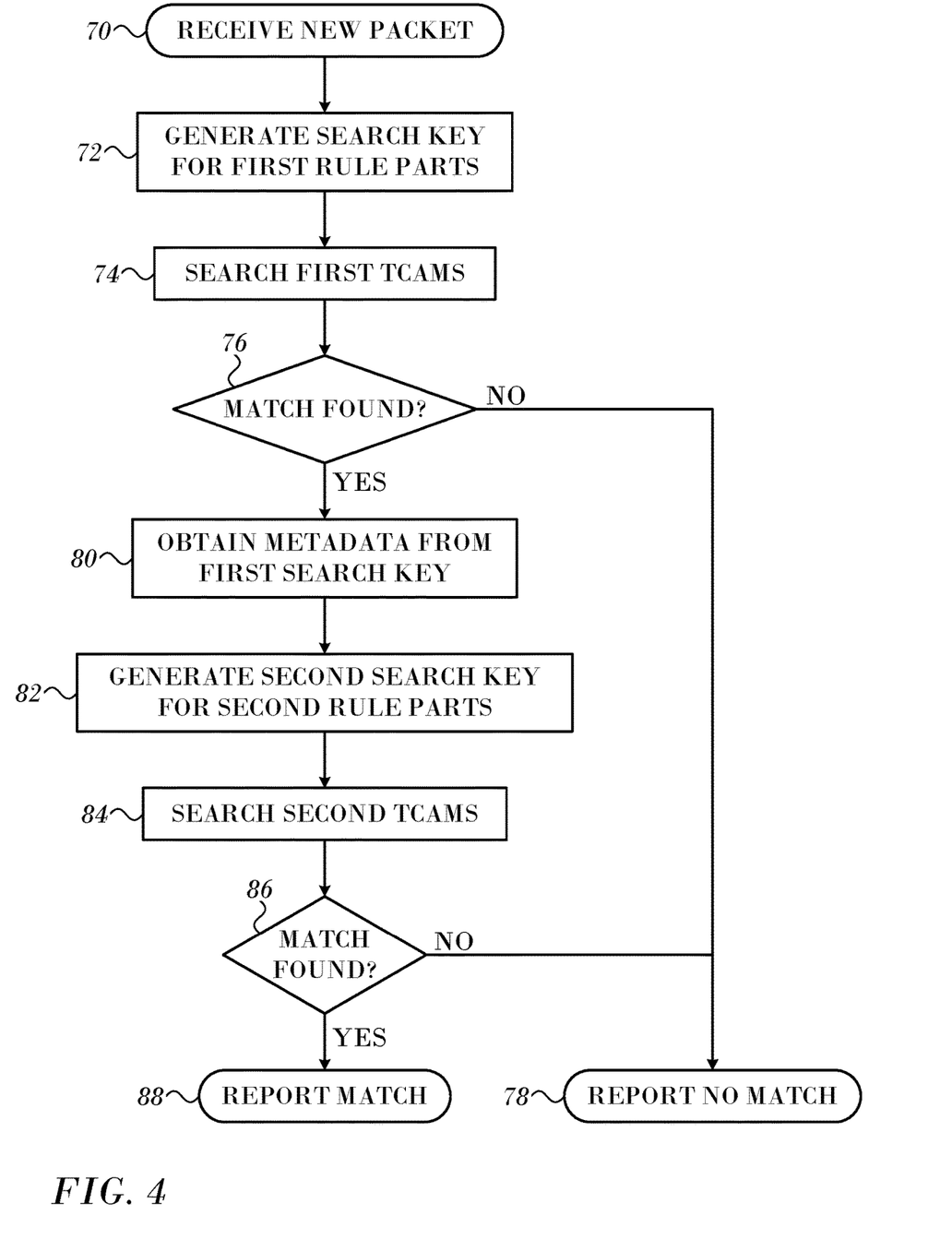
FIG. 4 is a flow chart of a method of searching a rule set in accordance with an embodiment of the invention.

Reference is now made to FIG. 4, which is a flow chart of a method of searching a rule set in accordance with an embodiment of the invention. At initial step 70 a new packet is received. The process steps are shown in a particular linear sequence in FIG. 4 for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method.

At step 72 a first search key is built from fields of the packet that correspond to the first rule parts obtained in the procedures of FIG. 2 and FIG. 3. At step 74 the key is then applied in a search of the first TCAMs using any suitable search algorithm.

Next, at decision step 76, it is determined if a match was found in step 74. If the determination at decision step 76 is negative, then "no match" is declared at final step 78.

If the determination at decision step 76 is affirmative, then a second look up is performed. Metadata is derived from the search key at step 80. Then at step 82 a second search key is generated from the packet, which corresponds to the fields and metadata in the second rule set. The second set of TCAMs is searched using the second search key in step 84.

Next, at decision step 86, it is determined if a match was found in step 84. If the determination at decision step 86 is affirmative, then a match result is declared at final step 88 and the packet is processed using information obtained in the matched second TCAM, which is outside the scope of this disclosure. Otherwise a "no match" result is declared in final step 78.

Second Embodiment

The inventors have found that an efficient encoding of the metadata M obtained in the first lookup and used for the second part avoids entries for the second part of the key, as metadata can be shared by entries for the second part of the key. One way of achieving such an encoding is to compress the fields of the first part in the metadata. Suppose that the first part is formed by fields $F_1, F_2, \ldots, F_n$, and that each of them has $u_1, u_2, \ldots, u_n$ unique values in the rule set. Then, matches with those values can be coded in $\log_2(1+u_i)$ bits (rounded up) leaving one combination for a match with 'x'. Therefore, in the proposed scheme $\log_2(1+u_i)$ bits are assigned to each field in the metadata M and the values that exist in the set of rules are mapped to the bit combinations.

The number of bits needed for the metadata will depend on the field variability. The above-described algorithm to select the fields having the lowest variability for the first part of the key also minimizes the number of bits needed to code the metadata.

In a practical implementation, bits in the metadata can be assigned to fields dynamically leaving spare bits to be assigned to fields when new rules are added to the set. This provides flexibility for applications on which the rules in the set change frequently.

For the Openflow databases tested, the number of bits needed to encode the fields in the metadata was smaller than ten. As the number of intersections was small, the overall memory usage of the proposed scheme was significantly lower than that of using a wider TCAM. Therefore, the proposed scheme can also be useful to reduce the amount of TCAM memory needed to store a set of rules.

The following example illustrates the encoding scheme.

Example 2

In this example the first part of the key is formed by three fields: protocol (UDP or TCP) and layer four source and destination ports. The set of rules was originally:
{(UDP,21,x), $B_1$}
{(UDP,x,80), $B_2$}
{(x,80,21), $B_3$}.

For the first part of the key, in the metadata two bits are assigned to the protocol field and coded as 00 for a match with TCP, 01 for a match with UDP and 10 for a match with 'x' on the protocol field. The value 11 is not used.

Similarly the other two fields occupy two bits: ports 21 and 80 are encoded as values 00 and 01, respectively. Again, the value 10 encodes the wildcard 'x'. The following coded entries for the metadata are created in the first TCAM as the first part of the key:
In(UDP,21,80)→01,00,01
(UDP,21,x)→01, 00, 10
(UDP,x,80)→01, 10, 01
(x,80,21)→10, 01, 00.

In the second TCAM the entries for the second part of the key are:
01,00,xx, $B_1$
01,xx,01, $B_2$
xx,01,00, $B_3$,
so that a match in the intersection has metadata that matches the first two entries on the second part. This method works because by adding the intersections on the first half, if a key matches a rule that has 'x' on a given field, either it has no overlapping rules or if it has, if the overlapping rules have that field defined, we have not matched the intersection and therefore, the value of the field in the packet cannot match the one in those rules. In summary, if we match a rule that has 'x' on a field it is safe to assign it a different value in the metadata for that field.

The benefit of adding the intersections can be understood by considering the following two rules:
{(udp,21,x), $B_1$}
{(udp,x,80), $B_2$}.

The first part of the rules are the protocol, source and destination ports. The metadata is coded for the lookup on the second part as:

(udp,21,x)→01,00,10
(udp,x,80)→01,10,01.

The second part is stored in the second TCAM as
01,00,xx, $B_1$
01,xx,01, $B_2$.

Without including intersections, a lookup for a packet udp,21,80 would match the first part. But now this metadata will not match in the second part, because 10 is different from 01 in the last field. However, since intersections are added, the first TCAM actually stores In(udp,21,80)→01,00,01
(udp,21,x)→01,00,10
(udp,x,80)→01,10,01.

Now the packet matches the intersection (the first rule in the preceding list), and the metadata 01,00,01 matches both rules in the second TCAM.

Example 3

For fields on which Longest Prefix Match (LPM) is used, e.g., in IP addresses, the case is more complex as we can have compatible rules and the encoding has to preserve that compatibility. For example, suppose we have the following values:

110.12.23.1
138.100.x.x
138.100.17.x
144.x.x.x
153.1.x.x.

If we assign three bits to encode matches we get:

110.12.23.1→000
138.100.x.x→001
138.100.17.x→010
144.x.x.x→011
153.1.x.x→100
Match with x→101, so that a packet that has 138.100.17.10 on the field will map to 010 and would not match rules that have 138,100.x.x (mapped to 001) in that field. To avoid this issue, we can take all the prefixes that have no shorter compatible prefixes and encode them. For the example those would be:

110.12.23.1→000
138.100.x.x→001
144.x.x.x→010
153.1.x.x→011
Match with x→100.

Then we use a second set of bits for the next prefix length for each of the coded prefixes. In the example, we have only one so we code:

138.100.17.x→0
Match with x→1, and the rules in the second part are coded as:

138.100.x.x→001 x
138.100.17.x→001 0.

So now a packet to 138.10.17.10 is coded as 010 0 and matches rules that contain both 138.100.x.x and 138.100.17.x. A packet to 138.100.34.21 is coded 010 1 and only matches 138.100.x.x.

The coding has to consider as many sub-blocks of bits as nested prefixes that are present in the databases. In the Classbench-NG databases that value is between 2 and 7 depending on the database. However, for the split of IPv6 on four groups of 32 bits, the number of nested prefixes in some of them is much lower. In particular, in the first 32 bits of the IPv6 address there are no nested prefixes or just one nested prefix in the databases used in the evaluation.

In any case, it can be seen, that the coding for LPM fields is more complex and in general will require more bits for the metadata. Therefore, in the selection of fields for the first part, a penalty in the metric is used for LPM fields to give preference to exact match fields.

Example 4

Evaluation of Openflow Databases.

A number of databases have been generated with Classbench-NG, which is an evolution of Classbench that supports IPv6 and Openflow. The two seeds (of1 and of2) described in the document J. Matoušek, et al., *ClassBench-ng: Recasting ClassBenchAfter a Decade of Network Evolution*, in Proceedings of the Symposium on Architectures for Networking and Communications Systems (ANCS '17) ("Matoušek") have been used to generate the databases shown in Table 2. They are taken from switches in cloud datacenters and have 16889 and 20250 rules respectively. In total, 22 databases were generated: two large databases (of1_seed and of2_seed) and 20 smaller ones. The databases that start with of1 and of2 were generated using of1 and of2 as a seed, respectively.

TABLE 2

| Database | Number of rules |
| --- | --- |
| of1_seed | 10627 |
| of2_seed | 47537 |
| of1_seed.10K.1 | 2775 |
| of1_seed.10K.2 | 2691 |
| of1_seed.10K.3 | 2649 |
| of1_seed.10K.4 | 3201 |
| of1_seed.10K.5 | 2585 |
| of1_seed.1K.1 | 475 |
| of1_seed.1K.2 | 688 |
| of1_seed.1K.3 | 663 |
| of1_seed.1K.4 | 497 |
| of1_seed.1K.5 | 657 |
| of2_seed.10K.1 | 5880 |
| of2_seed.10K.2 | 5906 |
| of2_seed.10K.3 | 6088 |
| of2_seed.10K.4 | 6004 |
| of2_seed.10K.5 | 6020 |
| of2_seed.1K.1 | 745 |
| of2_seed.1K.2 | 759 |
| of2_seed.1K.3 | 818 |
| of2_seed.1K.4 | 755 |
| of2_seed.1K.5 | 798 |

The key format is composed of the following fields:
4-tuple of source and destination IP addresses and ports protocol.
MAC source and destination.
Ethernet type.
IP TOS.
VLAN ID
VLAN priority.
Physical port on which the packet was received.

An analysis of the original of1 and of2 databases in Matoušek showed that three fields are always wildcards (VLAN ID, VLAN priority and IP TOS). The same applies to the generated databases. The number of different values for each field on the original databases was also small. In particular, Ethernet type, protocol and source port have very few values. The same patterns are observed on the generated databases.

To measure the number of unique values on a field we define the variability as the #field values/#rules. We also define "careness" as:

field values not x/#rules.

Careness gives an indication of how frequently a field is not all 'x'. As an example, the careness and variability for two of the generated databases are shown in Table 3 and Table 4, which show careness and variability for databases of1_seed. 10K.1 and of1_seed. 10K.2, respectively. It can be seen that there are fields that have very few different values and that are 'x' in most cases (for example in_port). Others have very few values but are not 'x' in most cases (for example eth_type or nw_proto). As discussed before, using those in the first part of the key can be beneficial.

It may be noted that for IP addresses, the variability of the /16 prefix is much lower than that of the full SIP/DIP. The number of values is reduced from a few hundreds to a few tens. This observation may be useful if we want to use IP addresses on the first part of the key. A similar behavior would be expected for IPv6 databases with longer prefixes as will be seen in the evaluation for IPv6 5-tuple+ presented below.

TABLE 3

Careness and variability for database
database of1_seed.10K.1

| Database | Careness | Variability |
|---|---|---|
| In: port | 0.76% | 0.72% |
| dl_src | 10.23% | 10.23% |
| dl_dst | 86.67% | 86.67% |
| eth_type | 81.30% | 0.04% |
| dl_vlan | 0% | 0% |
| dl_vlan_prio | 0% | 0% |
| nw_src | 52.43% | 14.27% |
| nw_dst | 85.91% | 5.98% |
| nw_tos | 0% | 0% |
| nw_proto | 81.30% | 0.11% |
| tp_src | 4.22% | 0.14% |
| tp_dsc | 50.99% | 1.48% |

TABLE 4

Careness and variability for database
database of1_seed.10K.2

| Database | Careness | Variability |
|---|---|---|
| In: port | 0.38% | 0.30% |
| dl_src | 12.90% | 12.90% |
| dl_dst | 83.74% | 83.73% |
| eth_type | 83.73%0 | 0.01% |
| dl_vlan | 0% | 0% |
| dl_vlan_prio | 0% | 0% |
| nw_src | 41.32% | 9.81% |
| nw_dst | 85.04% | 2.41% |
| nw_tos | 0% | 0% |
| nw_proto | 83.73% | 0.03% |
| tp_src | 7.03% | 0.04% |
| tp_dsc | 67.18% | 0.44% |

In one experiment, an exhaustive search on the field splitting was done and the combination of fields that minimizes the number of intersections created on the first part of the key was logged. The splitting is such that six fields were placed on the first part of the key. In most of the databases, the fields placed on the first part of the key that minimize the number of rules were: dl_vlan, dl_vlan_prio, nw_tos, nw_proto, eth_type and tp_src. The first three were always 'x' and the other three had a very small number of different values (less than 10 for the tp_src and 1 or 2 for the eth_type and nw_proto). For one of the databases (of1_seed. 1K.3.rules), the in_port was selected instead of the tp_src. The in_port also showed very small variability.

The results in terms of number of rules that will be needed on the first part of the TCAM are summarized in Table 5, which shows the number of rules needed on the first part of the key with optimal splitting. It can be seen that the number is very small as the fields are either always all 'x' or have a very small number of values. These results confirm that selecting fields with low variability can be effective in reducing the number of rules on the first half of the key. As for careness, it seems that having the field being not 'x' always or all 'x' always will tend to reduce the number of intersections. Therefore, values close to 100% or to 0% are preferred over values closer to 50%. The number of bits needed to encode the metadata was very small (less than 10) in all cases. This suggests that using 16 bits for the metadata could be feasible.

Evaluation of IPv6 5-Tuple+ Databases.

Since the number of seeds to generate Openflow databases in Classbench-NG is very limited, an additional evaluation was done using IPv6 5-tuple+ databases, which were also generated with Classbench-NG. In this case, the seeds from two BGP IPv6 tables (AS20 and AS6447) were used in addition to the default ones provided by Classbench-NG from the original Classbench, which are IPv4 addresses. The IPv6 source and destination addresses were split into four fields each covering 32 bits of the address (1-32,33-64,65-96 and 97-128). This gave a total of 12 fields for the rules.

The number of rules in each of the databases are shown in Table 6 and the number of rules needed on the first half of the key are summarized in Table 7. It can be observed that in most cases, just one rule is needed on the first half of the key. This is because there are sufficient fields that are not used to cover the first part. In more detail, in the databases that use the Classbench IPv4 seeds, the IP addresses are only defined up to /32 and thus the other three 32 bit blocks are always 'x'. This is not realistic for IPv6. For the other databases, we can see that the number of rules on the first part is larger, especially for the AS20 and AS6447 databases. Those use a seed from an IPv6 BGP routing table that is probably also not realistic. The IPv6 BGP routing table has many prefixes and lengths that will not be expected in a multi-field key. However, even for this worst case, the proposed scheme is able to use a number of rules on the first part that is smaller than the number of rules on the original databases.

The fields that have been selected for the first part in most cases include the IA source and destination ports, the protocol field and some blocks of the IPv6 addresses. In particular, in most cases, they include the first 32 bits of the source or destination addresses (in a few also the bits 65-96 of the source IPv6 address). Those which we have checked have none or just one nested prefix. Therefore the encoding of metadata is not complex. This should be expected for the first block of IPv6 addresses as few prefixes shorter than /32 will be used. The number of bits needed to encode the metadata was larger than for the Openflow databases but still small in all cases. Extending the metadata to 24 bits could be beneficial in order to have more margin. In summary, the proposed scheme is also able to deal with the IPv6 5-tuple+ databases.

The results from the analysis of the databases suggest that:
Some fields may not be used at all.
Some fields will have very limited number of values.

The optimal splitting is to place both categories of fields on the first part of the key. This enables a significant reduction in the number of rules that need to be stored in the first part. The low variability can also be exploited to implement an efficient encoding of the metadata (field compression) used for the second search that eliminates the need for rule replication. In summary, for databases that have fields with low variability, large keys can be handled efficiently.

TABLE 5

| Database | Number of rules |
| --- | --- |
| of1_seed | 8 |
| of1_seed.10K.1 | 20 |
| of1_seed.10K.2 | 20 |
| of1_seed.10K.3 | 20 |
| of1_seed.10K.4 | 16 |
| of1_seed.10K.5 | 20 |
| of1_seed.1K.1 | 12 |
| of1_seed.1K.2 | 8 |
| of1_seed.1K.3 | 16 |
| of1_seed.1K.4 | 8 |
| of1_seed.1K.5 | 12 |
| of2_seed | 8 |
| of2_seed.10K.1 | 20 |
| of2_seed.10K.2 | 12 |
| of2_seed.10K.3 | 16 |
| of2_seed.10K.4 | 12 |
| of2_seed.10K.5 | 16 |
| of2_seed.1K.1 | 16 |
| of2_seed.1K.2 | 12 |
| of2_seed.1K.3 | 16 |
| of2_seed.1K.4 | 12 |
| of2_seed.1K.5 | 16 |

TABLE 6

| Database | Number of rules |
| --- | --- |
| acl1_seed.b | 15093 |
| acl1_seed | 2893 |
| acl2_seed.b | 34473 |
| acl2_seed | 3455 |
| acl3_seed | 13038 |
| acl4_seed | 12639 |
| acl5_seed.b | 30105 |
| acl5_seed | 2638 |
| as20_acl4_seed | 35184 |
| as6447_acl5_seed | 8540 |
| fw1_seed.b | 7688 |
| fw1_seed | 3226 |
| fw2_seed.b | 2101 |
| fw2_seed. | 173 |
| fw3_seed.b | 3526 |
| fw3_seed | 1563 |
| fw4_seed.b | 18606 |
| fw4_seed | 5857 |
| fw5_seed.b | 8787 |
| fw5_seed | 2349 |
| ipc1_seed | 7995 |
| ipc2_seed.b | 2000 |
| ipc2_seed | 178 |

TABLE 7

| Database | Number of rules |
| --- | --- |
| acl1_seed.b | 1 |
| acl1_seed | 1 |
| acl2_seed.b | 1 |
| acl2_seed | 1 |
| acl3_seed | 1 |
| acl4_seed | 1 |

TABLE 7-continued

| Database | Number of rules |
| --- | --- |
| acl5_seed.b | 1 |
| acl5_seed | 1 |
| as20_acl4_seed | 10722 |
| as6447_acl5_seed | 5890 |
| fw1_seed.b | 1 |
| fw1_seed | 1 |
| fw2_seed.b | 1 |
| fw2_seed. | 1 |
| fw3_seed.b | 1 |
| fw3_seed | 1 |
| fw4_seed.b | 1 |
| fw4_seed | 1 |
| fw5_seed.b | 1 |
| fw5_seed | 1 |
| ipc1_seed | 1 |
| ipc2_seed.b | 1 |
| ipc2_seed | 1 |

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of classifying data items in communication, comprising the steps of:
   configuring a network element by:
      receiving a collection of rules relating to a plurality of fields of data items, wherein the rules may specify wildcard values for the fields:
      determining for each of the fields, a variability of the field in the collection of rules, according to respective numbers of unique values that occur in the field, in the collection of rules;
      dividing the plurality of fields into a first subset of the fields and a second subset of the fields, responsive to the determined variabilities of the fields wherein the first subset includes fields having a lowest variability among the fields;
      adding to the first subset intersections of overlapping fields of the first subset to form an augmented first subset;
      obtaining metadata from the augmented first subset;
      defining respective first parts of the rules in the collection from the augmented first subset of the fields; and
      defining respective second parts of the rules in the collection from the metadata and from the second subset of the fields;
   extracting respective search keys from data items, by the network element; and
   classifying the data items, by the network element, by matching one of the first parts and one of the second parts with the search keys extracted from the data items.

2. The method according to claim 1, wherein dividing the plurality of fields into a first subset of the fields and a second subset of the fields comprises including in the first subset at least one field having less than 10 different values in the collection of rules.

3. The method according to claim 1, wherein dividing the plurality of fields into a first subset and a second subset comprises including in the first subset ones of the fields that have wildcard values in all the rules of the collection.

4. The method according to claim 3, wherein dividing the plurality of fields into a first subset and a second subset comprises:
ranking remaining fields that do not have wildcard values in all the rules of the collection according to a variability thereof; and
adding to the first subset at least one of the lowest ranked remaining fields.

5. The method according to claim 4, further comprising measuring the variability of the fields according to respective numbers of different values that occur therein in the collection of rules divided by a number of rules in the collection of rules.

6. The method according to claim 4, wherein obtaining metadata comprises compressing the fields of the first parts of the rules.

7. The method according to claim 6, wherein compressing the fields comprises the steps of:
identifying respective numbers of unique values ($u_i$) in the fields; and
encoding the respective numbers of unique values in $\log_2(1+u_i)$ bits (rounded up).

8. The method according to claim 1, further comprising the steps of:
storing the first parts of the rules in a first TCAM array; and
storing the second parts of the rules in a second TCAM array,
wherein matching with the search keys comprises searching the first TCAM array and the second TCAM array.

9. The method according to claim 8, wherein dividing the plurality of fields comprises including in the first subset the fields having the lowest variability until adding an additional field to the first subset will cause the first subset to exceed a width of the first TCAM array.

10. The method according to claim 1, further comprising the steps of constructing the intersections of the overlapping fields using unique values of the overlapping fields other than wildcard values.

11. The method according to claim 1, wherein each of the fields includes more than 1 bit.

12. The method according to claim 1, wherein obtaining metadata from the augmented first subset comprises encoding the metadata with less than 10 bits.

13. The method according to claim 1, wherein dividing the plurality of fields comprises including in the first subset the fields having the lowest variability while giving preference to fields which have always or nearly always don't care values, or never or nearly never have don't care values.

14. The method according to claim 1, wherein the second subset is exclusive of the first subset.

15. An apparatus, comprising:
a network element, operative for receiving packets via a data network;
decision logic circuitry in the network element; and
a ternary content-addressable memory (TCAM) storing a collection of rules having a plurality of fields,
wherein the decision logic circuitry is operative for performing the steps of;
receiving a collection of rules relating to a plurality of fields of data items, wherein the rules may specify wildcard values for the fields;
determining for each of the fields, a variability of the field in the collection of rules, according to respective numbers of unique values that occur in the field, in the collection of rules;
dividing the plurality of fields into a first subset of the fields and a second subset of the fields, responsive to the determined variabilities of the fields wherein the first subset includes fields having a lowest variability among the fields;
adding to the first subset intersections of overlapping fields of the first subset to form an augmented first subset;
obtaining metadata from the augmented first subset;
defining respective first parts of the rules in the collection from the augmented first subset of the fields; and
defining respective second parts of the rules in the collection from the metadata and from the second subset of the fields;
storing the first parts of the rules in a first portion of the TCAM;
storing the second parts of the rules in a second portion of the TCAM,
extracting respective search keys from data items; and
matching one of the first parts and one of the second parts with the search keys thereof by searching the first portion of the TCAM and the second portion of the TCAM, respectively.

16. The apparatus according to claim 15, wherein in dividing the plurality of fields into a first subset of the fields and a second subset of the fields, the decision logic circuitry is configured to include in the first subset at least one field having less than 10 different values in the collection of rules.

17. The apparatus according to claim 15, wherein the decision logic circuitry is configured to include in the first subset ones of the fields that have wildcard values in all the rules of the collection.

18. The apparatus according to claim 17, wherein in dividing the fields, the decision logic circuitry is configured to:
rank remaining fields that do not have wildcard values in all the rules of the collection according to a variability thereof; and
add to the first subset at least one of the lowest ranked remaining fields.

19. The apparatus according to claim 18, wherein the decision logic circuitry obtains the metadata by compressing the fields of the first parts of the rules.

20. The apparatus according to claim 19, wherein the decision logic circuitry compresses the fields by the steps of:
identifying respective numbers of unique values in the fields; and
encoding the respective numbers of unique values in $\log_2(1+u_i)$ bits (rounded up).

21. The apparatus according to claim 18, wherein the decision logic circuitry is operative for measuring the variability of the fields according to respective numbers of different values that occur therein in the collection of rules divided by a number of rules in the collection of rules.

22. The apparatus according to claim 15, wherein the decision logic circuitry is operative for constructing the intersections of the overlapping fields using unique values of the overlapping fields other than wildcard values.

* * * * *